US 8,387,139 B2

(12) United States Patent
Jarrett et al.

(10) Patent No.: US 8,387,139 B2
(45) Date of Patent: Feb. 26, 2013

(54) THREAD SCANNING AND PATCHING TO DISABLE INJECTED MALWARE THREATS

(75) Inventors: Michael S. Jarrett, Kirkland, WA (US); Adrian M Marinescu, Sammamish, WA (US); Marius Gheorghe Gheorghescu, Redmond, WA (US); George C. Chicioreanu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1397 days.

(21) Appl. No.: 12/025,142

(22) Filed: Feb. 4, 2008

(65) Prior Publication Data

US 2009/0199297 A1 Aug. 6, 2009

(51) Int. Cl.
*G06F 12/14* (2006.01)
*G06F 12/16* (2006.01)
*G06F 11/00* (2006.01)

(52) U.S. Cl. ............... 726/22; 726/23; 726/24; 726/25
(58) Field of Classification Search .................. None
See application file for complete search history.

(56) References Cited

U.S. PATENT DOCUMENTS

| | | | |
|---|---|---|---|
| 6,698,016 B1 * | 2/2004 | Ghizzoni | 717/162 |
| 6,907,531 B1 | 6/2005 | Dodd et al. | |
| 7,036,147 B1 | 4/2006 | Hursey et al. | |
| 7,188,367 B1 | 3/2007 | Edwards et al. | |
| 7,237,008 B1 | 6/2007 | Tarbotton | |
| 7,269,851 B2 | 9/2007 | Ackroyd | |
| 7,398,553 B1 * | 7/2008 | Li | 726/22 |
| 7,496,904 B2 * | 2/2009 | Srivastava et al. | 717/133 |
| 7,797,702 B1 * | 9/2010 | Ferrie | 718/101 |
| 2005/0172338 A1 | 8/2005 | Sandu et al. | |
| 2006/0031673 A1 * | 2/2006 | Beck et al. | 713/164 |

(Continued)

FOREIGN PATENT DOCUMENTS

WO 2007133178 A2 11/2007

OTHER PUBLICATIONS

Florio, et al."When Malware Meets Rootkits", Symantec Security Response, Dublin. Originally published by Virus Bulletin, Dec. 2005. pp. 1-16.

(Continued)

*Primary Examiner* — Matthew Henning
(74) *Attorney, Agent, or Firm* — Powell IP Law, PLLC; Tracy Powell (57) ABSTRACT

An arrangement for scanning and patching injected malware code that is executing in otherwise legitimate processes running on a computer system is provided in which malware code is located in the memory of processes by extracting the start addresses of processes' threads and then searching near these addresses. Additional blocks of code in memory that are invoked by the code identified by each start address are also identified and the blocks are then matched against scanning signatures associated with known malware threads. If the entire signature can be matched against a subset of the blocks, then the thread is determined to be infected. The infected thread is suspended and in-memory modifications are performed to patch the injected code to render it harmless. The thread can be resumed or terminated to disable the protection mechanisms of the malware without causing any harm to the process in which the thread is injected.

20 Claims, 5 Drawing Sheets

U.S. PATENT DOCUMENTS

| | | | |
|---|---|---|---|
| 2006/0230388 A1 | 10/2006 | Hatlelid et al. | |
| 2006/0265749 A1* | 11/2006 | Kwon et al. | 726/24 |
| 2007/0044153 A1 | 2/2007 | Schuba et al. | |
| 2007/0101335 A1* | 5/2007 | Nagampalli et al. | 718/102 |
| 2007/0101432 A1 | 5/2007 | Carpenter | |
| 2007/0107057 A1 | 5/2007 | Chander et al. | |
| 2008/0016339 A1 | 1/2008 | Shukla | |
| 2009/0049550 A1* | 2/2009 | Shevchenko | 726/23 |
| 2009/0089040 A1* | 4/2009 | Monastyrsky et al. | 703/26 |

OTHER PUBLICATIONS

Schuster, "Searching for processes and threads in Microsoft Windows memory dumps", 2006 DFRWS. Published by Elsevier Ltd. pp. 1-7.

Chen, et al., "Spatial-Temporal Modeling of Malware Propagation in Networks", National Science Foundation under Grant ECS-0334759 and Georgia Tech Broadband, 2004. pp. 1-12.

* cited by examiner

THREAD SCANNING AND PATCHING TO DISABLE INJECTED MALWARE THREATS

BACKGROUND

Public networks such as the Internet are commonly used to allow businesses and consumers to access and share information from a variety of sources. However, security is often a concern when accessing the Internet because there is a threat of malicious software being downloaded from a website or received in an e-mail which may contain viruses, Trojan horses, or other malicious executable code (collectively referred to as "malware") that may infect computers inside the business or home.

An increasingly common technique used by malware authors is to create new threads of execution inside existing legitimate (i.e., trusted) processes running on a computer system. Known as code or process injection, the technique enables the new threads to protect and defend the rest of the malware installation by interfering with or recovering from any changes made by anti-malware products or tools.

Unfortunately, it is difficult for existing anti-malware products to identify such threads of execution accurately because the malicious code could be anywhere in the memory address space of any running process and the memory is not uniquely linked to a specific thread. In addition, even if the malicious code is detected by the anti-malware product, the process cannot always be killed as a whole. For example, if the running process is a user application process, killing it will cause the user to lose unsaved data. If the running process is a critical system process, killing it would cause the operating system to immediately crash.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An arrangement for scanning and patching injected malware code that is executing in otherwise legitimate processes running on a computer system is provided in which malware code is located in the memory of processes by extracting the start addresses of processes' threads and then searching near these addresses. Additional blocks of code in memory that are invoked by the code identified by each start address are also identified and the blocks are then matched against scanning signatures associated with known malware threads. If the entire signature can be matched against a subset of the blocks, then the thread is determined to be infected. The infected thread is suspended and in-memory modifications are performed to patch the injected code to render it harmless. Once modified, the thread can be resumed or terminated (as may be specified by the signature) to disable the protection mechanisms of the malware without causing any harm to the process in which the thread is injected.

In an illustrative example, when a malware detection module in an anti-malware product detects an instance of malware that is known to inject threads, it invokes a thread scan by a thread scanning module by which threads associated with one or more named processes are matched to a subset of known malware thread signatures. By limiting the number of scanning targets and malware thread signatures against which they are matched, very effective scanning and patching may be realized without significantly impacting overall computer system performance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings. Elements are not drawn to scale unless otherwise indicated.

DETAILED DESCRIPTION

Figure 1:
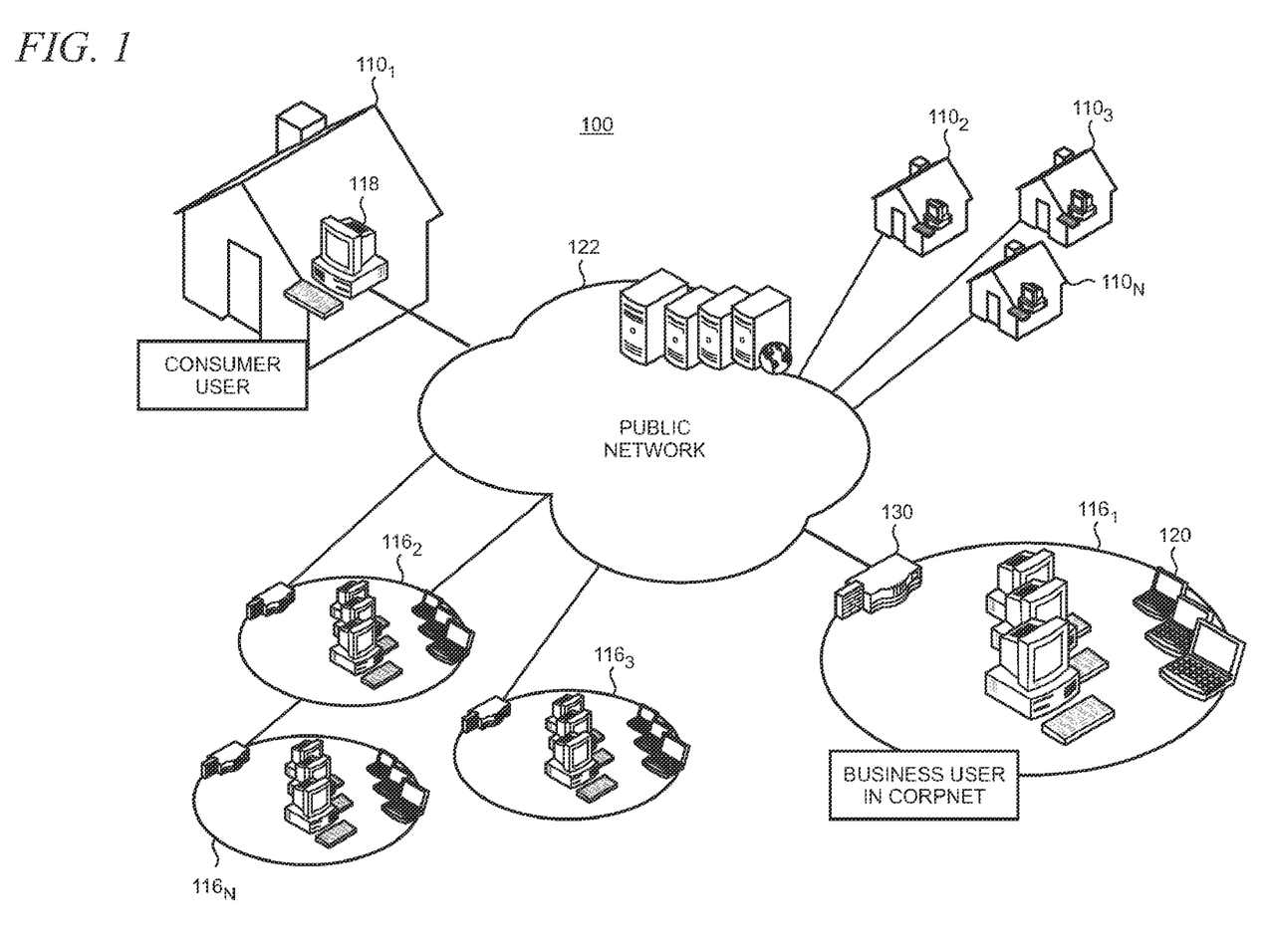
FIG. 1 shows an illustrative computing environment in which consumer and corporate users share public network infrastructure such as the Internet, and access resources located on the public network.

FIG. 1 shows an illustrative computing environment 100 in which a number of consumer users $110_{1, 2 \ldots N}$ and business users $116_{1, 2 \ldots N}$ share common public network infrastructure 122 such as the Internet. Resources 126 like web servers, databases, FTP (file transfer protocol) sites, and other Internet-based or distributed computing-type applications or services, may typically be accessed by users 110 and 116 using personal computers ("PCs"), laptops, and other computing platforms, as representatively indicated by reference numerals 118 and 120, respectively. In addition, file and data may be shared among users through such facilities as e-mail or peer-to-peer file sharing.

While the Internet has been invaluable in enabling positive and productive computing experiences for many users, it unfortunately has been a transport mechanism by which malware such as computer viruses, worms, Trojan horses, and rootkits may be distributed to infect computer systems around the world. The term malware as used here is a collective noun that refers to viruses, worms, Trojan horses, rootkits, and other code that is intentionally designed to perform malicious tasks on a computer system.

Once malware has reached a computer system over a transport mechanism, it will generally attempt to perform some malicious action, generally called a "payload." Payloads can include, for example, providing backdoor (i.e., unauthorized) access to the computer system, corrupting or deleting data on the computer, stealing information, or halting network service through a denial of service ("DoS") attack.

The business users 116 typically are located in a corporate network ("corpnet") that sits behind a firewall 130 that often provides, alone or in combination with other security products (not shown), protection against malware and other threats. Consumer users 110 often utilize locally running anti-malware products such as anti-virus programs, and may also receive some protection against malware from their Internet service provider ("ISP").

Unfortunately, many malware examples employ some kind of self-defense or protection mechanism to help reduce the likelihood of detection and/or removal by anti-malware products. For example, malware may use armor that attempts to foil an analysis of the malicious code. This may include detecting when a debugger is running and trying to prevent it from working correctly, or adding lots of meaningless code to make it difficult to determine the purpose of the malicious code. Malware may use a stealth technique to hide itself by intercepting requests for information and returning false data. Malware may also encrypt itself or its payload to prevent detection and data retrieval.

Another technique called "process injection" has become increasingly popular among malware authors to conceal their code from anti-malware products or frustrate attempts to remove the malware. This technique involves injecting the malicious code into legitimate processes that are running on the computer. For example, a remote access Trojan horse may inject malicious code into a process used by a web browser application to avoid detection by a firewall (e.g., firewall 130) or the anti-malware product running on a PC. Not only will the malicious code be provided with Internet access, but the security applications running on the firewall or PC, which are often rule-based, will often not detect the malware, but only see the trusted Web browser application and associated processes.

Malicious code can be injected, for example, by loading executable code such as a DLL ("Dynamically Linked Library") into a running process's memory. Operating systems, such as the Microsoft Windows® operating system, commonly provide several different ways to call external functions in a DLL file. Another approach malware authors take is to use the Windows-provided API (application programming interface) for debugging. Typically, a new thread is created in the target process with the thread's start address in memory set to the address of the executable malicious code. It is noted that the term "thread" is used here in its conventional sense to mean a set of instructions in program code that performs operations within an address space. Threads typically can execute independently of each other.

Even in cases where the injected malicious code can be detected, it can be often very difficult to remove, particularly when a system process has been impacted. One example of a critical system process in the Windows operating system is Winlogon. Terminating this process can often cause the computer system to immediately crash. This characteristic makes this process a popular target for malware authors. The author may configure the malware to create a custom thread in Winlogon to constantly monitor and then replace any files containing the malware code which are detected and deleted by anti-malware products.

Figure 2:
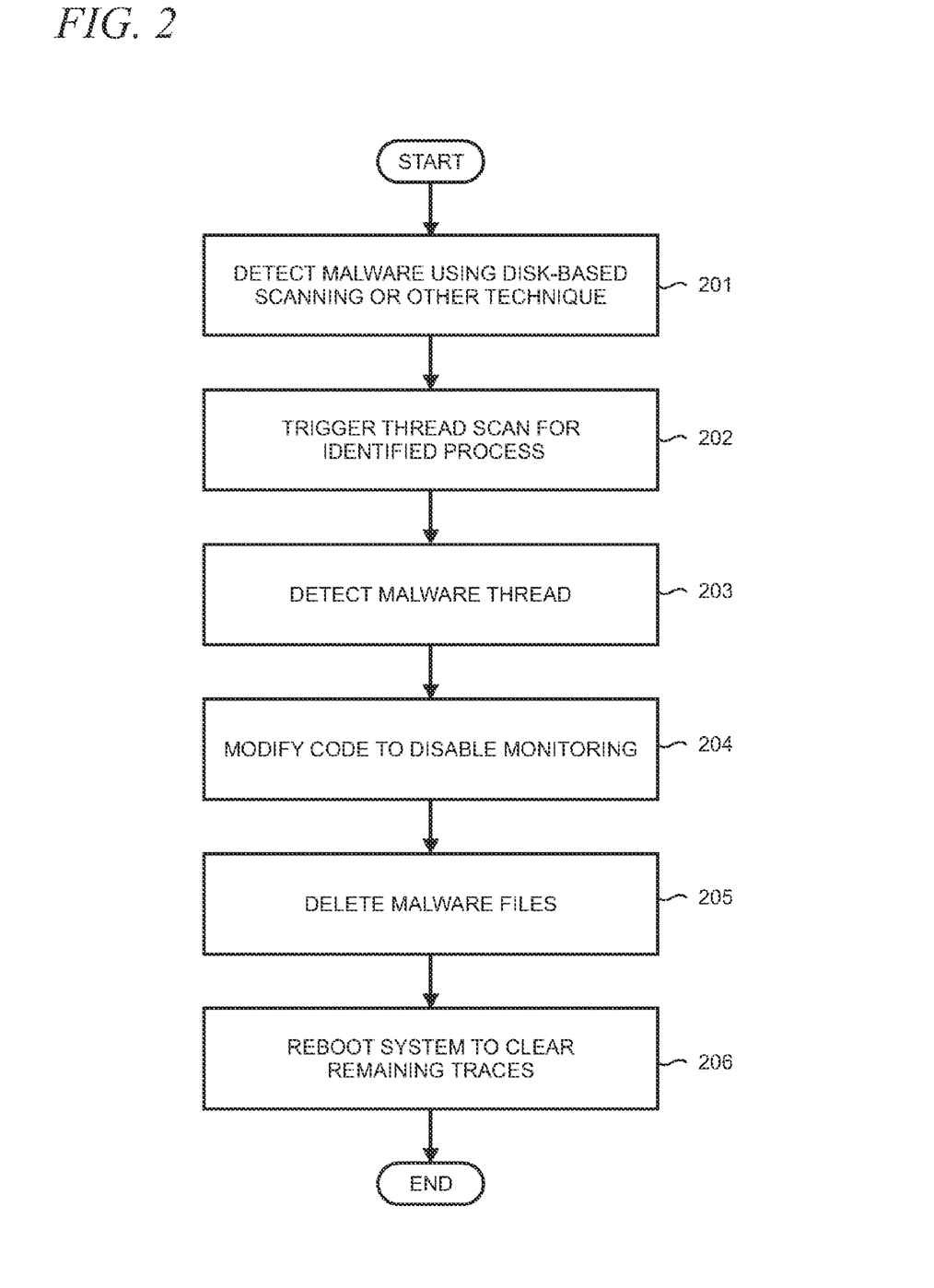
FIG. 2 is a flowchart of an overview of an illustrative method performed by the present thread scanning and patching to detect and disable injected malware.

The present thread scanning and patching arrangement can disable injected malware code, including code that is injected into critical system processes. In an illustrative example, the thread scanning and patching is implemented using a software module in an anti-malware product. FIG. 2 shows a flowchart for an overview of the techniques used to detect and disable injected malware code using the Winlogon example above. At 201, the anti-malware product with the thread scanning and patching module uses a conventional computer hard disk based scanning technique (or other known technique) to detect malware running on the Winlogon process, for example, by comparing files on the hard disk against signatures of known malware. At 202, a thread scan is triggered on the Winlogon system process. At 203, a thread of malicious code is detected. At 204, the code is modified to disable the constant monitoring by the malware. At 205, the malware files can be deleted. At 206, rebooting the computer system clears the remaining traces of the patched malware thread from Winlogon.

Figure 3:
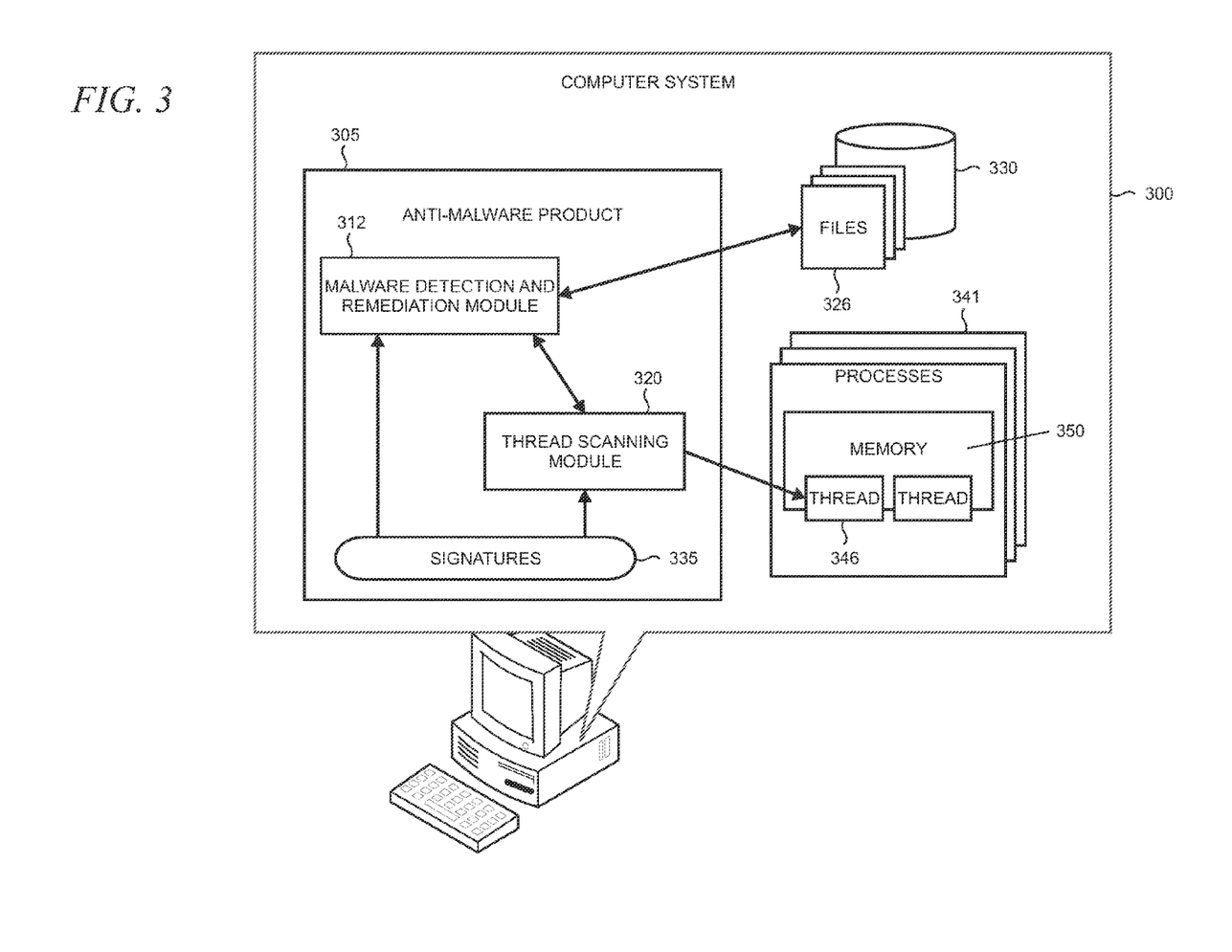
FIG. 3 shows an illustrative computer system that runs an anti-malware product which includes functionality supporting the present thread scanning and patching.
Figure 4:
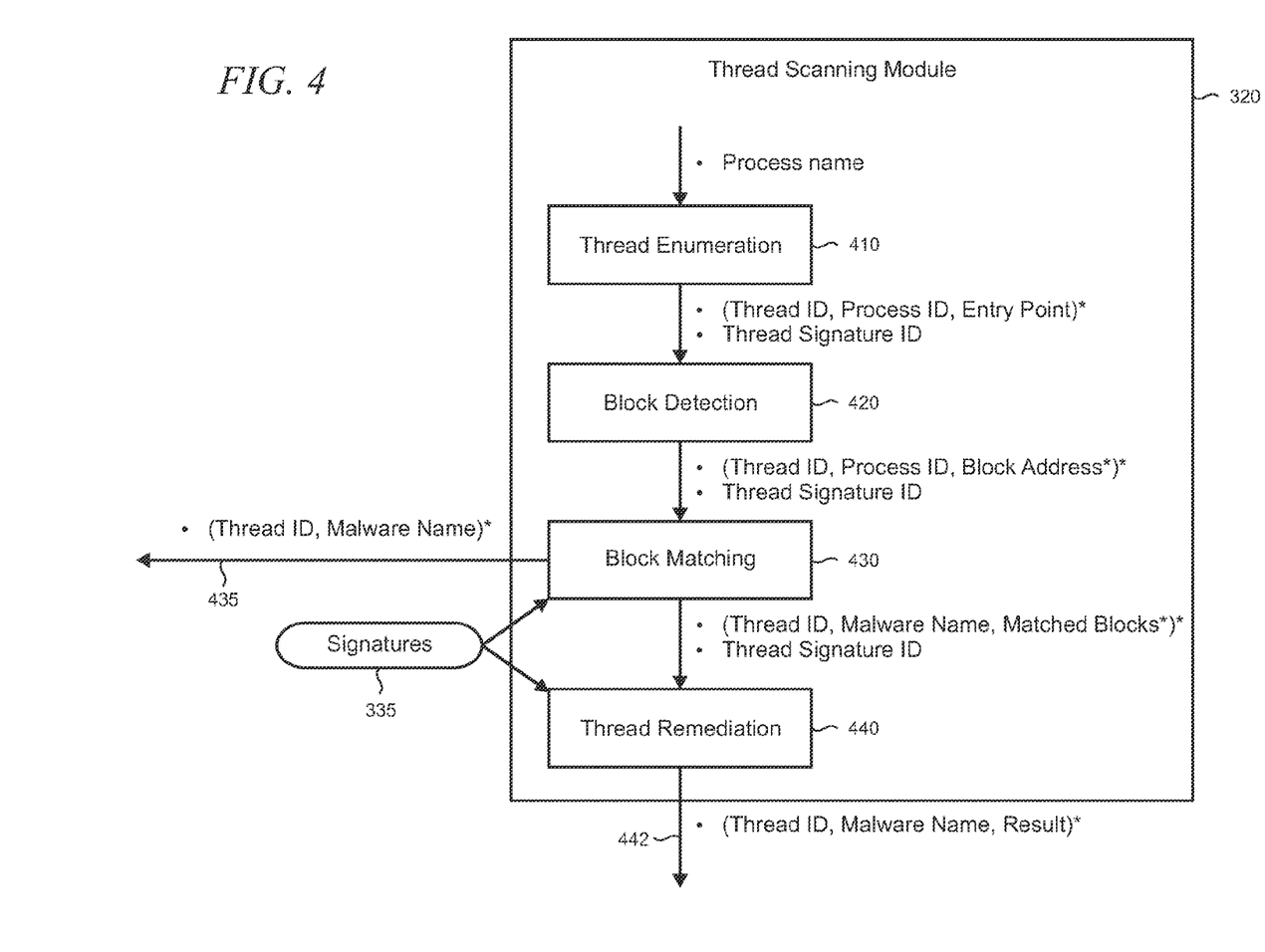
FIG. 4 shows components used in an illustrative thread scanning module.
Figure 5:
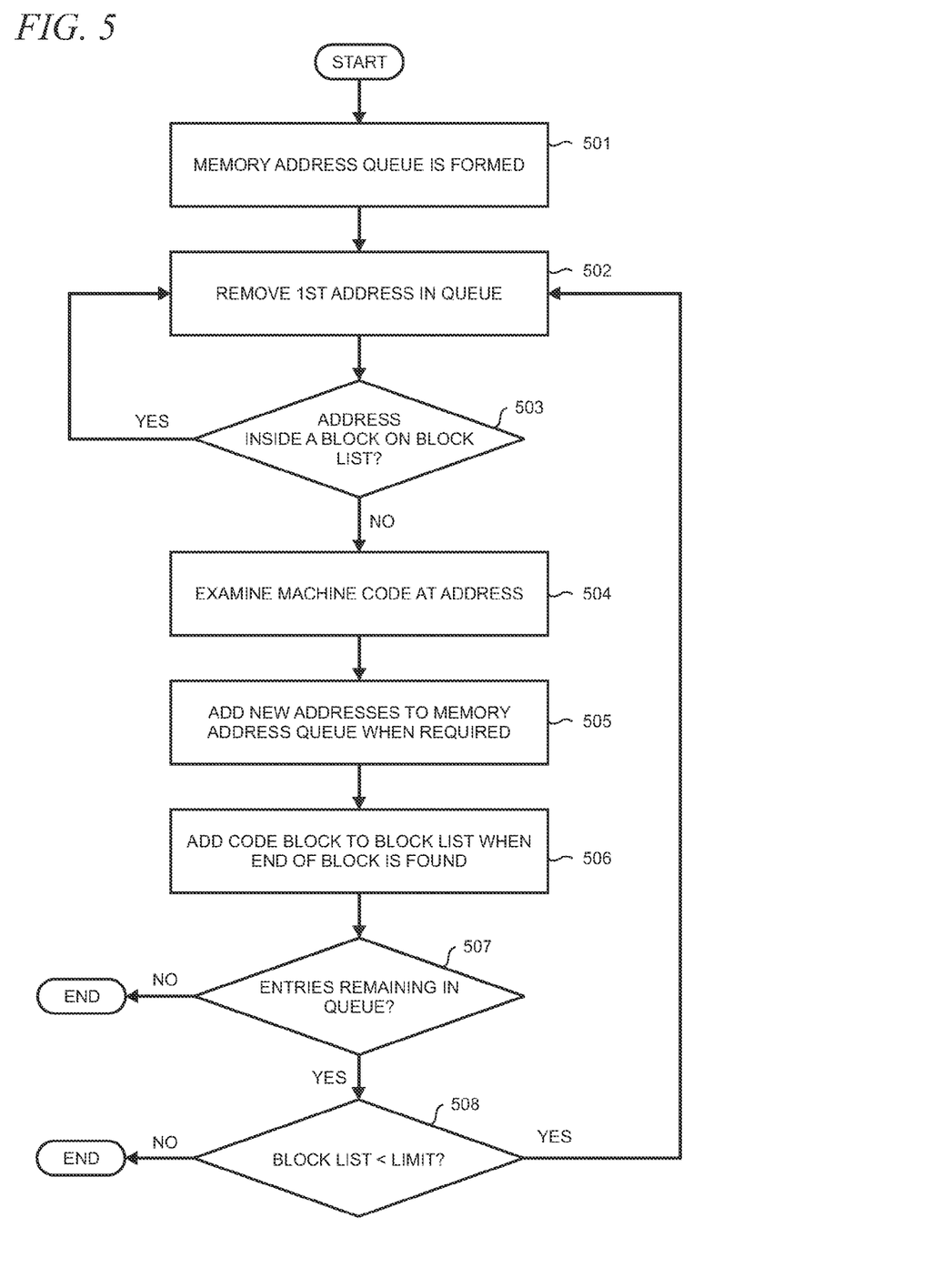
FIG. 5 is a flowchart of an illustrative method that is performed by a block detection component in the thread scanning module.

Details of the thread scanning and patching technique are shown in FIGS. 3-5 and described in the accompanying text. Turning now to FIG. 3, an illustrative computer system 300 is shown that supports an anti-malware product 305 that incorporates a malware detection and remediation module 312, and a thread scanning module 320. Computer system 300 is representative of a typical personal computer as used, for example, by a consumer user 110 or by a business user 116 as shown in FIG. 1.

The malware detection and remediation module 312, in this example, is arranged to apply any of a variety of known (i.e., "conventional") techniques to detect malware on the computer system 300, for example, by scanning files 326 on the computer system's hard disk drive 330 (or other storage medium such as a persistent or other non-volatile memory), and comparing data in the files 326 to signatures of known malware that are contained in a signature repository 335. Other conventional malware detection techniques that may be utilized include, for example, solutions that monitor network traffic leaving the computer system 300, or methodologies which employ memory-based scanning.

The signature repository 335 is used to hold signatures used for detecting malware with conventional disk-based techniques, as well as for holding signatures of known malware threads, termed "thread scanning signatures." In alternative implementations, the signatures used to support the malware detection techniques can be held separately from the thread scanning signatures.

In most implementations of the present arrangement, signatures 335 will contain instructions to direct the malware detection and remediation module 312 to invoke a thread scan (using the thread scanning module 320) for only a subset of all known malware threads. Sometimes, therefore, only specific processes 341 identified by name will be subjected to thread scanning. By being selective with respect to both the thread scanning targets and the number of malware signatures being matched against, an effective solution to injected malware can be provided while maintaining the overall performance of the computer system 300.

Accordingly, when malware is detected for which thread scanning is utilized, the malware detection and remediation module 312 makes a call to the thread scanning module and will pass the process name and Thread Signature ID as parameters to the thread scanning module 320. The thread scanning module 320 will locate threads 346 associated with the named processes in memory 350 in order to begin the thread scanning and patching technique. The details of the techniques used and the functional components of the thread scanning module are shown in FIG. 4 and described in more detail below.

As shown in FIG. 4, the thread scanning module 320 includes a thread enumeration component 410, a block detection complement 420, a block matching component 430, and a thread remediation component 440.

The thread enumeration component 410 takes the process name as an input and locates candidate threads for scanning based on the process name. The thread enumeration component 410 relies upon operating system functionality to generate a list of running processes on the computer system 300. The running process list is filtered by eliminating any process whose process name does not match the name received from the malware detection and remediation module 312.

Each process that remains after the filtering is identified by a Process ID. For each such process, the operating system is queried to generate a list of threads for that process where each thread is identified by a Thread ID. The thread enumeration component 410 then queries the operating system to obtain the start address of each thread's code in the process's memory.

The thread enumeration component 410 forwards the thread list (Thread ID, Process ID, Entry Point) to the block detection component 420. It is noted that the trailing asterisk notation used in FIG. 4, "(x)*" means "zero or more of (x)". Thus, for example, the notation (Thread ID, Process ID, Entry Point)* means that the thread list produced by the thread enumeration component 410 includes zero or more entries, each entry containing all of Thread ID, Process ID, and Entry Point.

The block detection module 420 uses the thread list (Thread ID, Process ID, Entry Point), and Thread Signature ID as inputs to analyze the machine code stored at a start address, and attempts to determine locations in memory where more code exists and the thread executes. The block detection component 420 then generates a list of detected blocks which is forwarded to the block matching component 430, (where each block in the list is identified by Block Address) to which blocks in a given signature can be matched against. The list is in the form (Thread ID, Process ID, Block Address*)* which means that there are zero or more entries in the block list where each entry contains a Thread ID, a Process ID, and zero or more Block addresses.

More specifically, for each thread, the block detection module 420 accesses the memory space of the process to which the thread belongs. As shown in FIG. 5, at 501, a queue of memory addresses is formed where the start point address thread is the initial entry. At 502, the first address in the memory queue is removed. At 503, if the address is inside a block on the block list, then the step at 501 is repeated.

At 504, the machine code of the address in the memory address queue is examined. At 505, if the machine code jumps to new addresses in the memory, then those new addresses are added to the memory address queue. At 506, when the end of the block of code is found, then the block is added to the block list.

The steps 501-506 are iterated so long as there are entries in the memory address queue, as indicated at 507, and the size of the block list is smaller than a predefined limit, as indicated at 508. This limit will typically be selected to meet the needs of a particular implementation as more resources in the computer system 300 will typically be consumed as the size of the block list increases.

Returning again to FIG. 4, block matching component 430 takes the detected block list (Thread ID, Process ID, Block Address*)* and Thread Signature ID as inputs. Each block is attempted to be matched against a set of blocks in a thread scanning signature in signatures 335. If all the blocks in the given thread scanning signature are matched, then the thread is determined to be infected with malicious code.

More specifically, each thread signature in the signature repository 335 defines the partial contents of multiple blocks of memory. To declare a thread as infected, every partial block in the thread scanning signature must be matched against one of the blocks identified by the block detection component 420. However, as only the thread scanning signatures explicitly identified by the Thread Signature ID (that is passed as a parameter to the thread scanning module 320) are used for the matching, resources in the computer system 300 can generally be used efficiently.

As indicated by arrow 435, threads that match any thread scanning signatures are passed back, by Thread ID and Malware Name, to the malware detection and remediation module 312 or other system or sub-system running on the computer system 300, for example, to be reported by the anti-malware product to an end-user, or system administrator. A list of matched blocks for any detected thread and malware name (Thread ID, Malware Name, Matched Blocks*)* is reported to the thread remediation component 440. The matching thread scanning signatures from repository 335 are also passed as shown in FIG. 4.

The thread remediation component 440 takes the identity of the malware thread and the list of matched blocks as inputs. Each thread reported to the remediation component 440 is suspended. The matching thread scanning signature, which is typically arranged to contain patch instructions, is then examined. The patch instructions reference specific locations within the blocks and provide new values for the memory in these locations. The new values are written to the specified locations so that the process memory associated with the infected thread is modified.

Once modified, the thread may either be resumed or terminated, depending on the instructions in the thread scanning signature. A report may then be forwarded by Thread ID, Malware Name and Result (e.g., resumed, terminated), as indicated by arrow 442 to the malware detection and remediation module 312 or other system or sub-system running on the computer system 300.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for disabling malicious functionality in a thread that is injected into a process running on a computer system, the method comprising the steps of:

receiving, by the computer system comprising at least one memory, identification of named processes in which malware code is suspected to have been injected;

generating a query arranged for identifying threads associated with the named processes;

extracting a start address location in the named processes' memory for each of the threads;

searching for additional locations invoked by the start address for each of the threads, the searching comprising:

forming a memory address queue wherein a start point of the queue is the start address location;

removing an address from the queue when that address is inside a block on a block list;

examining machine code at the address when the address is not inside the block list, the machine code being examined to identify new addresses; and adding the new addresses to the queue if the machine code jumps to the new addresses or adding a block of code to the block list when end of the block is found;

responsive to the searching, listing the blocks of code that are associated with the threads;

matching the blocks of code with blocks in a thread scanning signature to determine if a thread is infected with malware, the thread scanning signature defining partial contents of blocks of memory; and declaring the thread as infected if identified blocks of code match all the blocks in the thread scanning signature.

2. The method of claim 1 including the further steps of receiving patching instructions from the thread scanning signature and performing in-memory modifications to the malware code.

3. The method of claim 2 including a further step of suspending the thread.

4. The method of claim 2 including a further step of terminating the thread or resuming the thread once the in-memory modifications have been performed.

5. The method of claim 1 in which the identification is received from a malware detection module in response to the detection of malware, the malware detection module being arranged to detect malware using one or more conventional detection techniques.

6. The method of claim 1 in which the searching further Comprises iterating the searching steps so long as addresses remain in the queue and length of the block list is below a predefined limit.

7. The method of claim 1 in which the query is directed to an operating system running on the computer.

8. The method of claim 1 in which the extracting is performed by obtaining the start address of the thread from an operating system running on the computer.

9. A computer storage medium, the computer storage medium not consisting of a propagating signal, storing instructions which, when executed by one or more processors disposed in an electronic device, implements a thread scanning module, comprising:
 a thread enumeration component arranged for locating candidate threads for thread scanning for named processes that are identified as being suspected of having been compromised by injected malware, and further arranged for determining a start address in the named processes' memory for the threads;
 a block detection component operatively coupled to the thread enumeration component and arranged for locating blocks of code executed by the threads, that:
  forms a memory address queue wherein a start point of the queue is the start address location;
  removes an address from the queue when that address is inside a block on a block list;
  examines machine code at the address when the address is not inside the block list, the machine code being examined to identify new addresses; and
  adds the new addresses to the queue if the machine code jumps to the new addresses or adding a block of code to the block list when end of the block is found;
 a block matching component operatively coupled to the block detection component and arranged for matching the blocks of code with stored thread scanning signatures of known malware threads; and
 a thread remediation component operatively coupled to the block matching component and arranged for suspending execution of code in the thread.

10. The computer storage medium of claim 9 in which the named processes are identified by a malware detector that (a) identifies malware by comparing a file on a storage volume with a signature of known malware, or (b) monitors network traffic out of the electronic device.

11. The computer storage medium of claim 10 in which the thread remediation component is further arranged to perform in-memory modification of the threads to defeat the threads' self-defense or protection mechanisms.

12. The computer storage medium of claim 11 in which the thread remediation component is further arranged to resume the threads once the in-memory modification has been performed.

13. The computer storage medium of claim 10 in which the thread remediation component is further arranged to kill the threads.

14. The computer storage medium of claim 11 in which the candidate threads are located by querying the operating system to generate a list of threads that are associated with the named processes.

15. A system, comprising:
 a processing unit operatively coupled to at least one memory;
 a malware detection module arranged for detecting malware known to inject a thread into a process by (a) scanning data files located on a storage medium and comparing the scanned data files against signatures of known malware, or (b) by monitoring traffic out of a computing system, or (c) by scanning memory of the computing system, and being further arranged for invoking a thread scan for a named process associated with the thread;
 a thread scanning module operatively coupled to the malware detection module, the thread scanning module being arranged for locating, responsively to the invoking, code blocks in memory executed by the thread, the thread scanning module comprising at least a thread remediation component performing remediation of an infected thread, the remediation including performing in-memory modification of the infected thread, the thread scanning module comprises a block detection module that:
  forms a memory address queue wherein a start point of the queue is the start address location;
  removes an address from the queue when that address is inside a block on a block list;
  examines machine code at the address when the address is not inside the block list, the machine code being examined to identify new addresses; and
  adds the new addresses to the queue if the machine code jumps to the new addresses or adding a block of code to the block list when end of the block is found; and
 a signature repository for storing thread scanning signatures to which the code blocks are matched to determine if the thread is infected with malware.

16. The system of claim 15 in which the thread scanning module locates the code blocks by accessing a memory space used by the named process to which the thread belongs.

17. The system of claim 15 in which the remediation further including terminating the infected thread.

18. The system of claim 17 in which the thread scanning module is arranged for generating a report containing information about the infected thread, the report containing a malware name and a result of the remediation.

19. The system of claim 15 in which the signatures comprises instructions to invoke a thread scan.

20. The system of claim 15 in which the remediation further include resuming the threads once the in-memory modification has been performed.

* * * * *